United States Patent
Friedman et al.

(10) Patent No.: US 9,940,202 B2
(45) Date of Patent: *Apr. 10, 2018

(54) SELF-HEALING USING A VIRTUAL BOOT DEVICE

(71) Applicant: INTERNATIONAL BUSINESS MACHINES CORPORATION, Armonk, NY (US)

(72) Inventors: Alex Friedman, Herzliya (IL); Constantine Gavrilov, Rishon-le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/074,479

(22) Filed: Nov. 7, 2013

(65) Prior Publication Data

US 2014/0281462 A1    Sep. 18, 2014

Related U.S. Application Data

(63) Continuation of application No. 13/830,081, filed on Mar. 14, 2013.

(51) Int. Cl.
  *G06F 1/32*   (2006.01)
  *G06F 11/14*  (2006.01)

(52) U.S. Cl.
  CPC ............ *G06F 11/1417* (2013.01); *G06F 1/32* (2013.01); *G06F 2201/815* (2013.01)

(58) Field of Classification Search
  CPC . G06F 1/32; G06F 1/26; G06F 1/3203; G06F 1/323; G06F 1/28; G06F 1/00
  USPC .. 713/1, 2, 3, 300, 310, 320, 321, 322, 323, 713/324, 330, 340, 375
  See application file for complete search history.

(56) References Cited

U.S. PATENT DOCUMENTS

| 5,732,268 A * | 3/1998 | Bizzarri | ............................ 713/2 |
| 6,931,558 B1 * | 8/2005 | Jeffe | ................... G06F 11/1464 713/340 |
| 7,437,423 B1 * | 10/2008 | Gole | ................... G06F 11/2092 709/212 |

(Continued)

FOREIGN PATENT DOCUMENTS

EP    1764687 B1    3/2010

OTHER PUBLICATIONS

Lin Tao et al., "Implementation of Linux in embedded system," Control & Automation No. 7: 27-149, 2005.

*Primary Examiner* — Jaweed A Abbaszadeh
*Assistant Examiner* — Keshab Pandey
(74) *Attorney, Agent, or Firm* — Griffiths & Seaton PLLC

(57) ABSTRACT

Methods, apparatus and computer program products implement embodiments of the present invention that enable a computer system comprising networked computers to self-heal from a boot failure of one of the computers. In some embodiments, upon detecting a first computer having a memory and a physical boot device failing to successfully load a boot image, a second computer defines a virtual boot device in communication with the first computer and the second computer and having a boot image for the first computer. Subsequent to defining the virtual boot device, the second computer can configure the first computer to boot from the virtual boot device.

6 Claims, 3 Drawing Sheets

(56) References Cited

U.S. PATENT DOCUMENTS

| | | |
|---|---|---|
| 7,516,319 B2 | 4/2009 | Chen |
| 7,546,449 B2 | 6/2009 | Wu |
| 7,546,450 B2 | 6/2009 | Danielsen |
| 7,594,068 B2 | 9/2009 | Diehl |
| 7,650,490 B2 | 1/2010 | Barron, Jr. et al. |
| 7,949,814 B2 | 5/2011 | Chan |
| 8,271,772 B2 * | 9/2012 | Komoriya et al. ............... 713/2 |
| 2004/0073783 A1 | 4/2004 | Ritchie |
| 2006/0242320 A1 * | 10/2006 | Nettle ................. H04L 67/1019 709/245 |
| 2007/0294566 A1 * | 12/2007 | Solyanik ............... G06F 9/4416 714/6.11 |
| 2009/0150598 A1 * | 6/2009 | Jung .................. G06F 11/1666 711/103 |
| 2009/0287915 A1 * | 11/2009 | Gattegno et al. ................. 713/2 |
| 2010/0058041 A1 | 3/2010 | John et al. |
| 2010/0191948 A1 | 7/2010 | Komoriya et al. |
| 2011/0317599 A1 * | 12/2011 | Takano ................ H04B 7/0413 370/310 |
| 2012/0011395 A1 * | 1/2012 | Chou .................. G06F 11/1417 714/6.13 |
| 2012/0017111 A1 | 1/2012 | Kumarasamy et al. |

\* cited by examiner

SELF-HEALING USING A VIRTUAL BOOT DEVICE

CROSS-REFERENCE TO RELATED APPLICATIONS

This application is a Continuation of U.S. patent application Ser. No. 13/830,081, filed on Mar. 14, 2013, and is related to U.S. patent application Ser. Nos. 13/829,612, 13/829,906, 13/830,019, and 13/830,153, each filed Mar. 14, 2013, and which are incorporated herein by reference.

FIELD OF THE INVENTION

The present invention relates generally to computer systems, and specifically to configuring a computer to boot from a virtual boot device.

BACKGROUND

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby enabling the computer to skip some hardware initializations and resets. Additionally, during a warm boot the memory may be reset.

In addition to a warm boot and a cold boot, the Linux operating system offers a method of rapidly booting a new operating system kernel via the kexec function. The kexec function first loads a new kernel into memory and then immediately starts executing the new kernel. Using kexec to boot a new kernel is referred to a "hot" boot/reboot, since the computer's memory is not reset during the boot.

The description above is presented as a general overview of related art in this field and should not be construed as an admission that any of the information it contains constitutes prior art against the present patent application.

SUMMARY

There is provided, in accordance with an embodiment of the present invention a method, including defining, using a second computer, a virtual boot device having a boot image for a first computer having a memory and a physical boot device, and configuring the first computer to boot from the virtual boot device.

There is also provided, in accordance with an embodiment of the present invention an apparatus, including a first computer having a memory and a physical boot device, and a second computer arranged to define a virtual boot device having a boot image for the first computer, and to configure the first computer to boot from the virtual boot device.

There is further provided, in accordance with an embodiment of the present invention a computer program product, the computer program product including a non-transitory computer readable storage medium having computer readable program code embodied therewith, the computer readable program code including computer readable program code configured to define a virtual boot device having a boot image for a first computer having a memory and a physical boot device, and computer readable program code configured to arrange the first computer to boot from the virtual boot device.

BRIEF DESCRIPTION OF THE DRAWINGS

The disclosure is herein described, by way of example only, with reference to the accompanying drawings, wherein.

DETAILED DESCRIPTION OF EMBODIMENTS

In computing, a boot comprises an initial set of operations that a computer performs when electrical power is switched on (also referred to as power cycling). During a boot, a computer may load software components such as an operating system kernel, services and applications. The software components that are loaded during a boot are typically stored in a system startup configuration file. For example, during a boot, a computer configured (i.e., "arranged") as a storage system may load a Linux operating system kernel, a network TCP/IP service and a storage application configured to process input/output (I/O) requests received from one or more host computers.

Software components that are loaded during a boot can be stored on a boot device as a boot image. When a computer system boots, the boot image is retrieved and stored in memory as a software stack. In other words, a loaded software stack may comprise an in-memory representation of a corresponding boot image on a boot device.

In a computer network coupling a first computer to a second computer, there may be instances when upon power being cycled to the first computer, the first computer fails to successfully boot (i.e., load and execute) a boot image from the first computer's boot device. Embodiments of the present invention provide methods and systems for the first computer to recover from the failed boot by defining a virtual boot device for the first computer, and configuring the first computer to boot from the virtual boot device.

In some embodiments, if the second computer detects the first computer failing to successfully load and execute a boot image, the second computer can define a virtual boot device for the first computer, configure the first computer to boot from the virtual device, and power cycle the first computer. Upon power cycling, the first computer can now load a boot image from the virtual boot device.

While the embodiments described herein relate generally to a storage system such as clustered storage controller, it will be understood that embodiments of the present invention may also be used for other types of networked computer systems.

Figure 1:
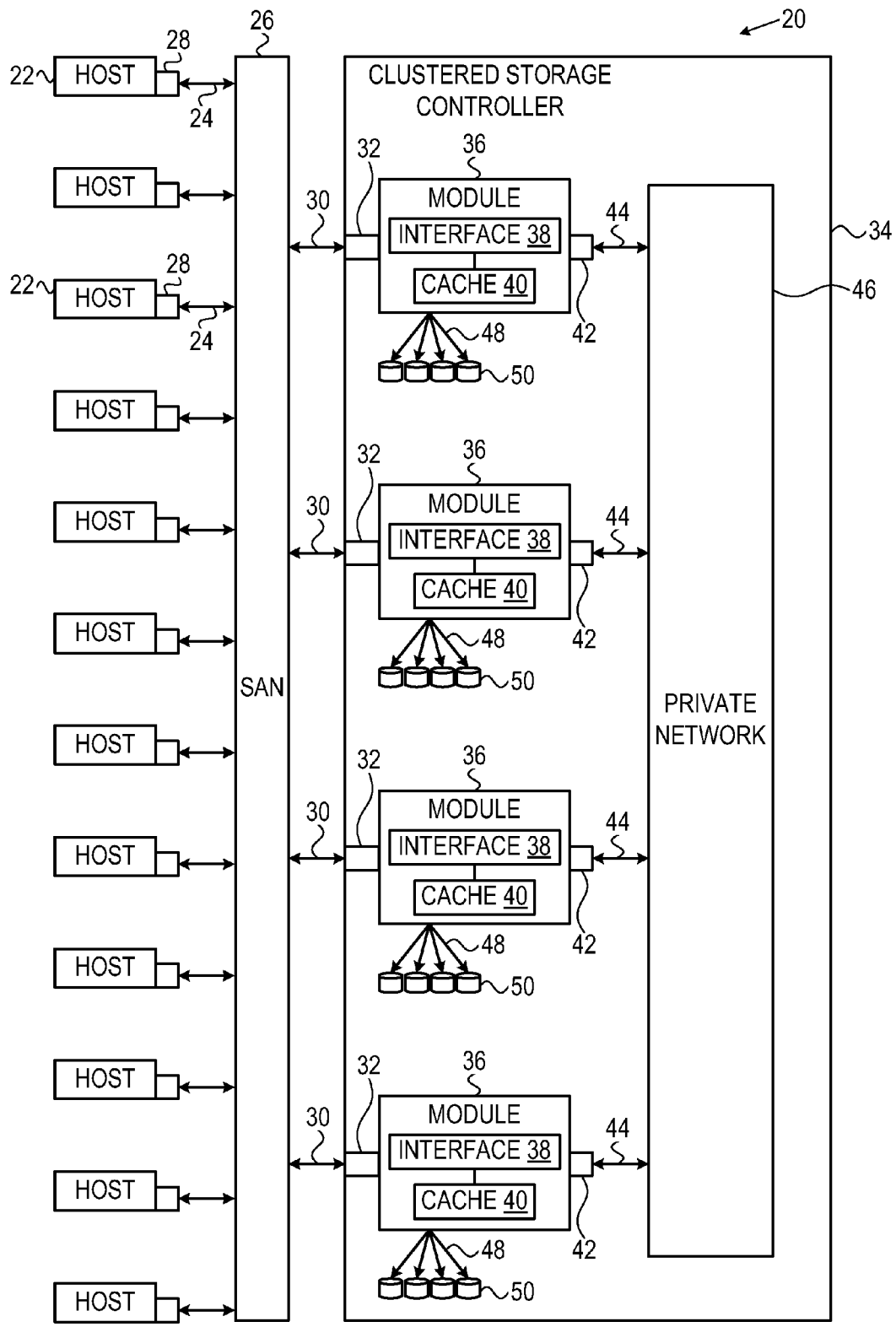
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Self-Healing from a Failed Boot

Figure 2:
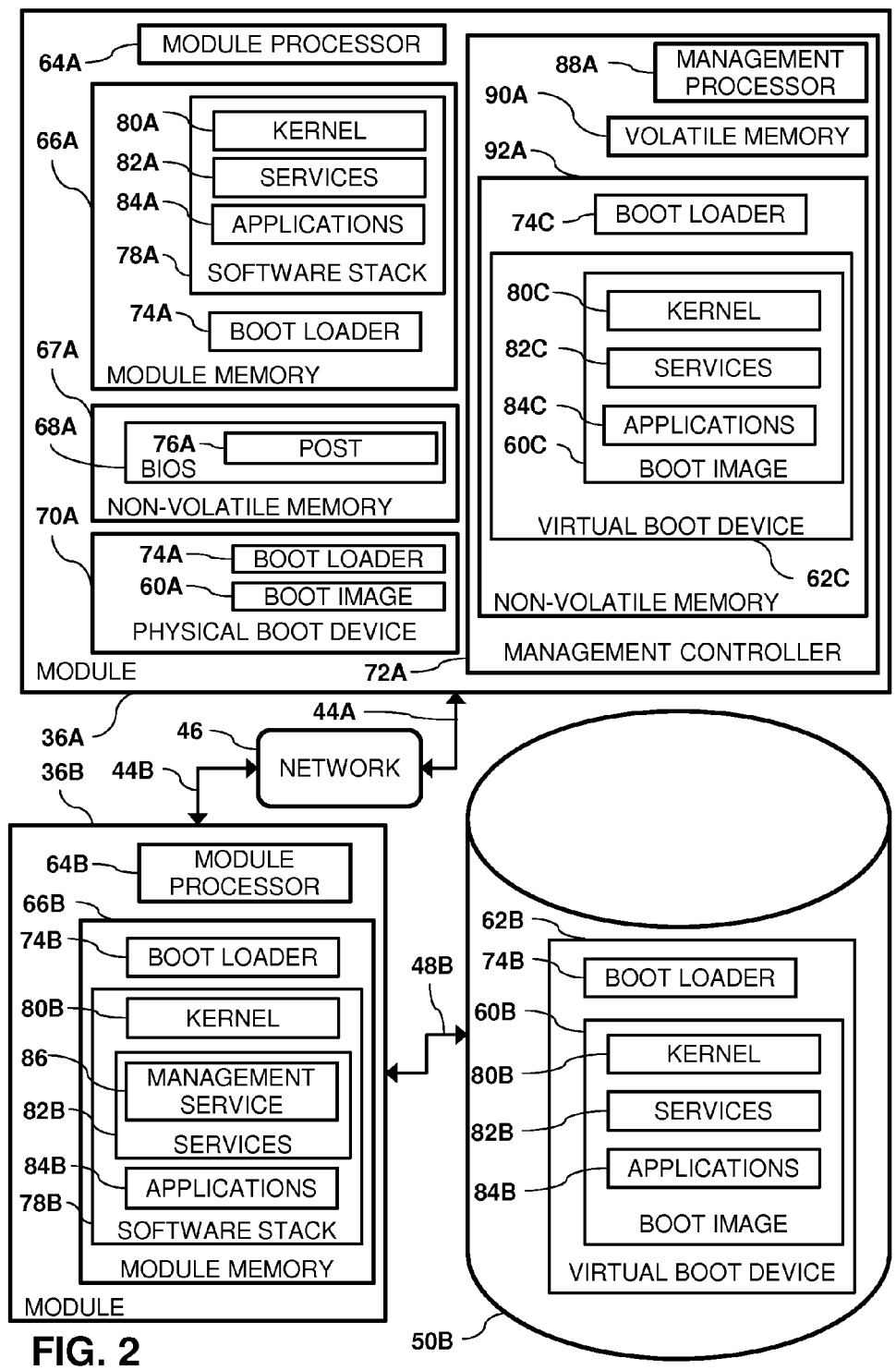
FIG. 2 is a block diagram of modules of the storage system configured to self-heal using a virtual boot device, in accordance with an embodiment of the present invention.

FIG. 2 is a block diagram of modules 36 configured to self-heal using a boot image 60 stored on a virtual boot device 62, in accordance with an embodiment of the present invention. In the description herein, modules 36 and their respective components, data connections 44, 48 and connected storage devices 50 may be differentiated by appending a letter to the identifying numeral, so that modules 36 comprise a first module 36A and a second module 36B. Alternatively a given module 36 may just be referred to as module 36. For purposes of clarity, not all components in module 36A are included in module 36B (i.e., in FIG. 2).

Module 36 comprises a module processor 64, a module memory 66, a non-volatile memory 67, a physical boot device 70 and a management controller 72. Physical boot device 70 may comprise a storage device such as a hard disk, an optical disk, a flash device (such as Compact Flash, USB stick or SDCard) or a solid state drive (SSD). Physical boot device 70 stores a boot loader 74 and boot image 60. In module 36A, boot loader 74A is typically stored on a master boot record of boot device 70A.

Non-volatile memory 67 comprises a BIOS 68 configured to store power-on self-test (POST) procedures 76. When power is cycled to module 36, processor 64 can be configured to execute POST procedures 76, which loads boot loader 74 to memory 66. In the embodiments described herein, POST procedures 76 can be configured to load (and start executing) a given boot loader 74 from either physical boot device 70 or from a given virtual boot device 62.

In operation, boot loader 74 is configured to load a corresponding boot image 60 (i.e., stored on the same physical boot device 70 or virtual boot device 62 as the boot loader), and store the components of the loaded boot image to a software stack 78 in memory 66. Each of the boot images comprise an initial collection of components that boot loader 74 can load, upon power being cycled to module 36.

Boot image 60 comprises a kernel 80, one or more services 82 and one or more applications 84. As shown in module 36B, services 82 may comprise a management service 86 configured to detect hardware and/or software failures in the other modules 36 storage controller 34. While the configuration in FIG. 2, shows management service 86 executing in module 36B, other configurations are considered to be within the spirit and scope of the present invention. For purposes of system redundancy, multiple (but not necessarily all) modules 36 may execute management service 86 to detect failures in the storage controller.

Management controller 72 is configured to monitor operation of module 36, and to reconfigure hardware and/or software settings as necessary in order to optimize the module's performance. In the description herein, software components stored in management controller 72 differentiated by appending a letter to the identifying numeral, so that the software components stored in management controller 72 comprise boot image 60C, virtual boot device 62C, boot loader 74C, kernel 80C, services 82C and applications 84C.

Management controller 72 comprises a management processor 88, a volatile memory 90 and a non-volatile memory 92. While managing module 36, management processor 88 may be configured to power cycle module 36, and to communicate with the other modules 36 in storage controller 34. Additionally, as described hereinbelow, non-volatile memory 92 may be configured to store virtual boot device 62C.

Processor 64 typically comprises a general-purpose central processing unit (CPU), which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

Typically, management controller 72 is implemented as a "system-on-chip" (SOC), running an embedded software application. In this alternative embodiment, the SOC may execute a software stack comprising a "standard" operating system (OS) and services (e.g., a Linux™ kernel and a web server) that are typically not user-upgradeable. The SOC is typically dedicated (i.e., not general purpose) and may be tightly controlled by a vendor. In other words, upgrades are typically provided by the vendor (or manufacturer), and may be considered a "system firmware", similar to BIOS 68.

The SOC may function as a robust, self-healing and self-sufficient system, configured to control processor 64 and the module processor's peripheral hardware, even when the controlled hardware malfunctions or crashes. This robustness may be possible because the hardware and software components of management controller 72 are typically designed to be self-sufficient and durable. Additionally, since management controller 72 may be configured to run a "controlled" software designed for a specific purpose (i.e., an end-user is typically not able to load the general purpose software stack to memory 90 or memory 92), the management controller can be more stable than kernel 80 running on processor 64, and therefore the management controller may be configured to control the module processor.

While the embodiments describe herein have software stack 78 comprising kernel 80, services 82 and applications 84, any organized collection comprising any number of components is considered to be within the spirit and scope of the present invention. For example, the collection (e.g., software stack 78) may comprise only kernel 80.

Figure 3:
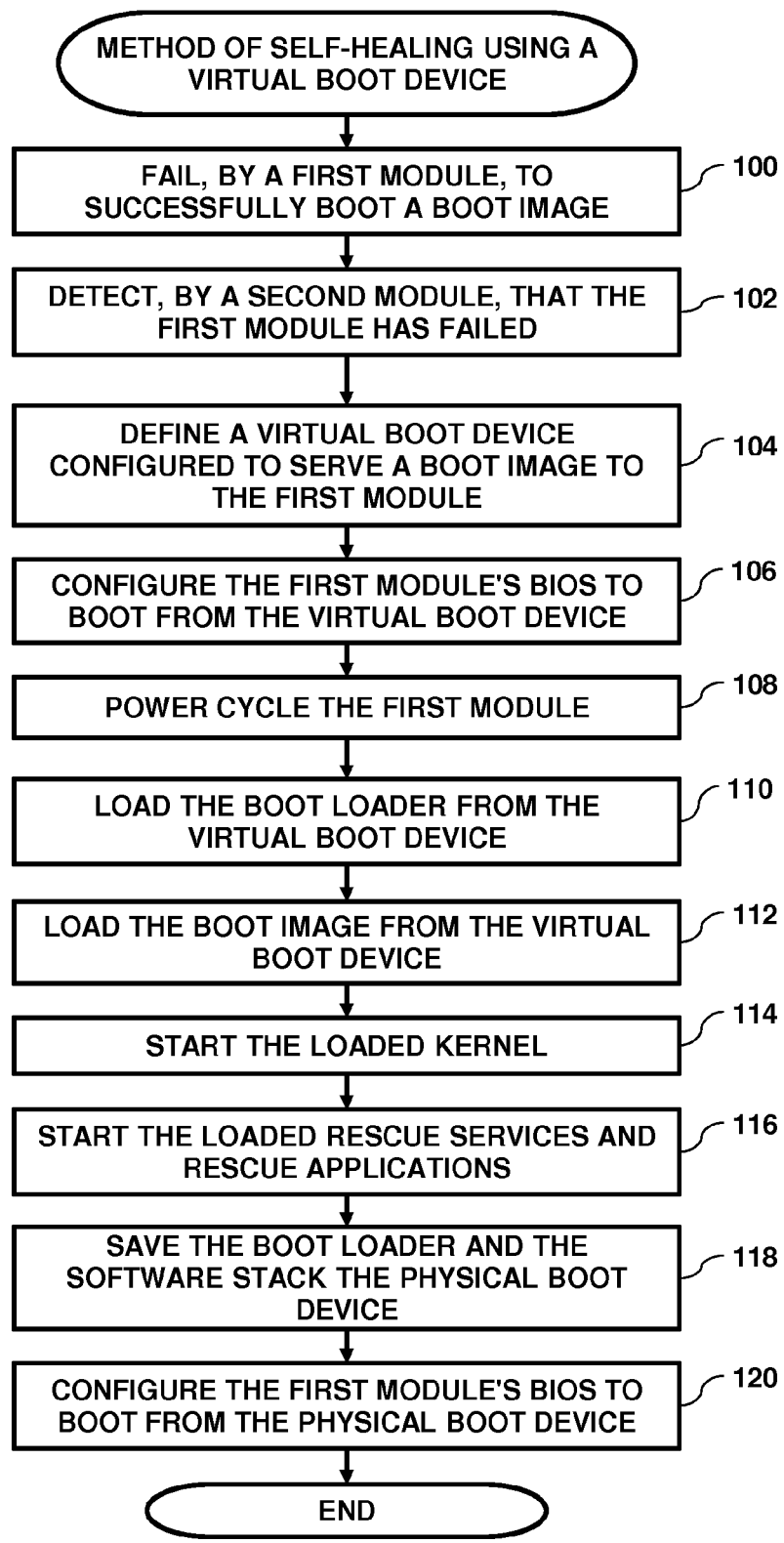
FIG. 3 is a flow diagram that schematically illustrates a method of self-healing using the virtual boot device, in accordance with an embodiment of the present invention.

FIG. 3 is a flow diagram that schematically illustrates a method for storage controller 34 to self-heal (i.e., from a failure of module 36A) using a given virtual boot device 62, in accordance with an embodiment of the present invention. In the embodiments described herein, upon power cycling module 36A, POST 76A is initially configured to load boot loader 74A from physical boot device 70A.

In an initial step 100, power is cycled to module 36A, and processor 64A fails to boot (i.e., load and execute) boot image 60A from physical boot device 70A. The boot failure may be a result of a corrupted boot image 60A or a problem with one of the physical regions storing the boot image on physical boot device 70A. Alternatively, one of the software components in boot image 60A may fail to execute properly. For example, a given service 82A (e.g., a TCP/IP service) may have been recently upgraded, and the given service crashes upon being executed.

In a detect step 102, management service 86 detects that module 36A has failed. To detect the failure, management service 86 may attempt to communicate with module 36A, and detects that module 36A is not responding. For example, management service 86 may convey, via a unicast transmission, a request to processor 64A, and not receive a reply within a given time period.

Upon detecting a failure of module 36A, management service 86 defines, in a definition step 104, a given virtual boot device 62 to serve a given boot image 60. Typically, virtual boot device 62 comprises a logical volume on a storage device (or non-volatile memory) coupled to modules 36A and 36B.

In a first embodiment, management service 86 conveys, via network 46, boot loader 74 and boot image 60 to management controller 72. Upon receiving the software components, management processor 88A creates virtual boot device 62C in non-volatile memory 92A, and stores the received boot loader 74C and boot image 60C to virtual boot device 62C. In a second embodiment, management service 86, creates virtual boot device 62B on storage device 50B (or any storage device 50 in storage controller 34), and stores boot loader 74B and boot image 60B to virtual boot device 62B. Typically, management service 86 defines virtual boot device 62 using the first embodiment for smaller boot images 60 (e.g., less than 200 megabytes), and defines the virtual boot device using the second embodiment for larger boot images 60.

In embodiments where management service 86 defines a given virtual boot device 62B on storage device 50B, management controller 72A can map to the virtual boot device by establishing a communication path between processor 88A and the management service, thereby enabling the management service to "serve" the virtual boot device to module 36A. To establish the communication path, management controller 72A may use protocols such as Internet Small Computer System Interface (iSCSI), Common Internet File System (CIFS), Network Files System (NFS) and Hypertext Transfer Protocol (HTTP).

In the first and the second embodiments described hereinabove, management service 86 may create boot images 60B and 60C from software stack 78B executing from memory 66B. Alternatively, management service 86 may retrieve a factory default boot image (not shown) or a previous version of the boot image (also not shown) from a given storage device 50.

In an additional embodiment, management service 86 may be configured to reformat physical boot device 70A, to report and repair any detected problems, and to save software stack 78B (i.e., a "production" software stack 78) to the physical boot device.

Saving software stack 78B to physical boot device 70A is described in more detail in U.S. patent application "Live Initialization of a Boot Device", referenced above. Saving software stack 78B to a given virtual boot device 62 can be performed using the embodiments described in the referenced U.S. patent application.

In a configuration step 106, management processor 88A configures BIOS 68 to enable POST 76 and kernel 80 (executing in memory 66) to detect and boot from the defined virtual boot device (i.e., the virtual boot device defined using the first and the second embodiments described supra). Upon configuring BIOS 68, POST 78 and kernel 80 can access the defined virtual boot device via (i.e., by communicating with) management controller 72. In some embodiments, kernel 80 and POST 78 may trigger a System Management Interrupt (SMI) handler configured to "trap" access to the virtual boot device. Alternatively, POST 78 may comprise specific functions that are configured to access management controller 72.

Upon configuring BIOS 68A, processor 88A power cycles module 36A in a power cycling step 108. In a first load step 110, processor 34A executes POST procedures 76A and loads boot loader 74 from the defined virtual boot device to memory 66A, and starts executing the loaded boot loader. In a second load step 112, the loaded boot loader retrieves boot image 60C from the defined virtual boot device and stores the components of the boot image to software stack 78A in memory 66A.

In a boot step 114, processor 64A starts executing (i.e., boots) kernel 80A, and in a start step 116, processor 64A starts executing services 82A and applications 84A. In some embodiments, upon successfully executing kernel 80A, services 82A and applications 84A, processor 64A, in a save step 118, saves boot loader 74A and software stack 78A to physical boot device 70A using embodiments described in U.S. patent application "Live Initialization of a Boot Device", referenced above. To save the software stack, processor 64A can save the components of software stack 78A in memory 66A to boot image 60A on physical boot device 70A.

Subsequent to saving the boot loader and the software stack to the boot image, processor 64A may convey a reconfiguration message to management controller 72A requesting the management controller 72A to reconfigure BIOS 68A to boot from physical boot device 70A (i.e., upon next power cycling of module 36A). Finally, in a reconfiguration step 120, processor 88A reconfigures BIOS 68 to boot from physical boot device 70A, and the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining, using a second computer, a virtual boot device, the virtual boot device having a boot image for a first computer having a memory and a physical boot device, the virtual boot device in communication with the first computer and the second computer;
subsequent to configuring the first computer, power cycling the first computer, and upon the power cycling, loading, by the first computer, the boot image from the virtual boot device to a software stack in the memory;
configuring, by the second computer, the first computer to boot from the virtual boot device; wherein the second computer is configured to define the virtual boot device in response to detecting a failure of the first computer, and detecting the failure comprises the second computer conveying a request to the first computer and not receiving a response to the request; and
subsequent to booting the first computer from the virtual boot device, automatically reconfiguring, by the second computer, the first computer to boot from the physical boot device upon a subsequent power cycle, wherein the second computer reconfigures the first computer by reformatting the physical boot device of the first computer, reporting and repairing problems of the physical boot device encountered during the reformatting to the second computer, saving a factory default boot image to the physical boot device, and reconfiguring a basic input/output system (BIOS) of the first computer to switch from booting from the virtual boot device to the physical boot device of the first computer upon the subsequent power cycle.

2. The method according to claim 1, and comprising saving the software stack to a physical boot device, and configuring the first computer to boot from the physical boot device.

3. The method according to claim 1, wherein the boot image comprises at least one of an operating system kernel, a service, and a software application.

4. The method according to claim 3, wherein loading the boot image comprises retrieving the one or more software components from the boot image, storing the retrieved one or more components to a software stack in a memory, and executing the one or more components in the software stack.

5. The method according to claim 1, wherein configuring the first computer comprises storing a boot loader and the boot image to the virtual boot device, mapping the virtual boot device to the first computer, and arranging the first computer to load the boot loader from the virtual boot device upon the power cycling, the boot loader configured to load the boot image.

6. The method according to claim 5, wherein the virtual boot device comprises a logical volume on a storage device coupled to the first and the second computer, and configured to store the boot loader and the boot image.

* * * * *